United States Patent
Reaves

(10) Patent No.: US 10,188,220 B2
(45) Date of Patent: Jan. 29, 2019

(54) SEAT COVER WITH OCCUPANT COVERING FEATURE

(71) Applicant: Tisha M. Reaves, Columbus, OH (US)

(72) Inventor: Tisha M. Reaves, Columbus, OH (US)

(*) Notice: Subject to any disclaimer, the term of this patent is extended or adjusted under 35 U.S.C. 154(b) by 0 days.

(21) Appl. No.: 15/631,865

(22) Filed: Jun. 23, 2017

(65) Prior Publication Data

US 2017/0367491 A1 Dec. 28, 2017

Related U.S. Application Data

(60) Provisional application No. 62/355,040, filed on Jun. 27, 2016.

(51) Int. Cl.
*A47C 31/11* (2006.01)
*B60N 2/60* (2006.01)
*A47G 9/02* (2006.01)

(52) U.S. Cl.
CPC ............ *A47C 31/11* (2013.01); *A47G 9/0223* (2013.01); *B60N 2/6009* (2013.01)

(58) Field of Classification Search
CPC ....... A47C 31/11; A47C 31/10; A47G 9/0223; B60N 2/6009; B60N 2/58; B60N 2/60
USPC ....... 297/217.1, 218.1–218.5, 219.1, 219.11, 297/219.12, 225, 228.1, 228.11–228.12
See application file for complete search history.

(56) References Cited

U.S. PATENT DOCUMENTS

| | | | |
|---|---|---|---|
| 1,875,525 A | 9/1932 | Thexton et al. | |
| 1,942,111 A | 1/1934 | Levi | |
| 2,129,225 A | 9/1938 | Mednick | |
| 2,771,939 A | 11/1956 | Trubitt | |
| 2,793,683 A | 5/1957 | Trubitt | |
| 2,800,169 A | 7/1957 | Armbrecht | |
| 2,811,198 A | 10/1957 | Krogh | |
| 2,822,862 A | 2/1958 | Zacks | |
| 5,950,261 A * | 9/1999 | Hay | A41B 13/06 2/69 |
| 6,309,017 B1 | 10/2001 | Middleton | |
| 6,394,543 B1 * | 5/2002 | Dunne | B60N 2/2806 297/219.12 |
| 6,634,709 B1 | 10/2003 | Hetherington | |
| 6,764,134 B1 * | 7/2004 | Crescenzi | A47C 31/00 2/69 |
| 7,506,927 B1 * | 3/2009 | Williams | A61K 9/007 297/180.12 |
| 7,779,492 B2 * | 8/2010 | Mangano | A47C 7/383 5/417 |
| 9,681,764 B1 * | 6/2017 | Boynton | A47G 9/066 |
| 9,707,876 B2 * | 7/2017 | White | B60N 2/6009 |
| 2005/0045674 A1 * | 3/2005 | Rehbein | A47D 13/025 224/160 |
| 2006/0012228 A1 | 1/2006 | Bardouche | |

(Continued)

*Primary Examiner* — Mark R Wendell
(74) *Attorney, Agent, or Firm* — Standley Law Group LLP; Eric Gayan

(57) ABSTRACT

Seat covers, more particularly, seat covers having a seat covering portion adapted to cover at least a portion of a seat, and an occupant covering portion adapted to simultaneously cover at least a portion of a human occupant of said seat. Exemplary seat covers may be fitted or non-fitted in design, and may include a retention mechanism for releasably securing the seat covering portion to a seat. Exemplary seat covers may be configured for use with, among other things, furniture such as reclining chairs, and motorized vehicle seats.

7 Claims, 8 Drawing Sheets

(56) References Cited

U.S. PATENT DOCUMENTS

2014/0265483 A1 9/2014 Miller
2015/0238024 A1* 8/2015 Lucas .................. A47D 1/00
                                                                      297/181

* cited by examiner

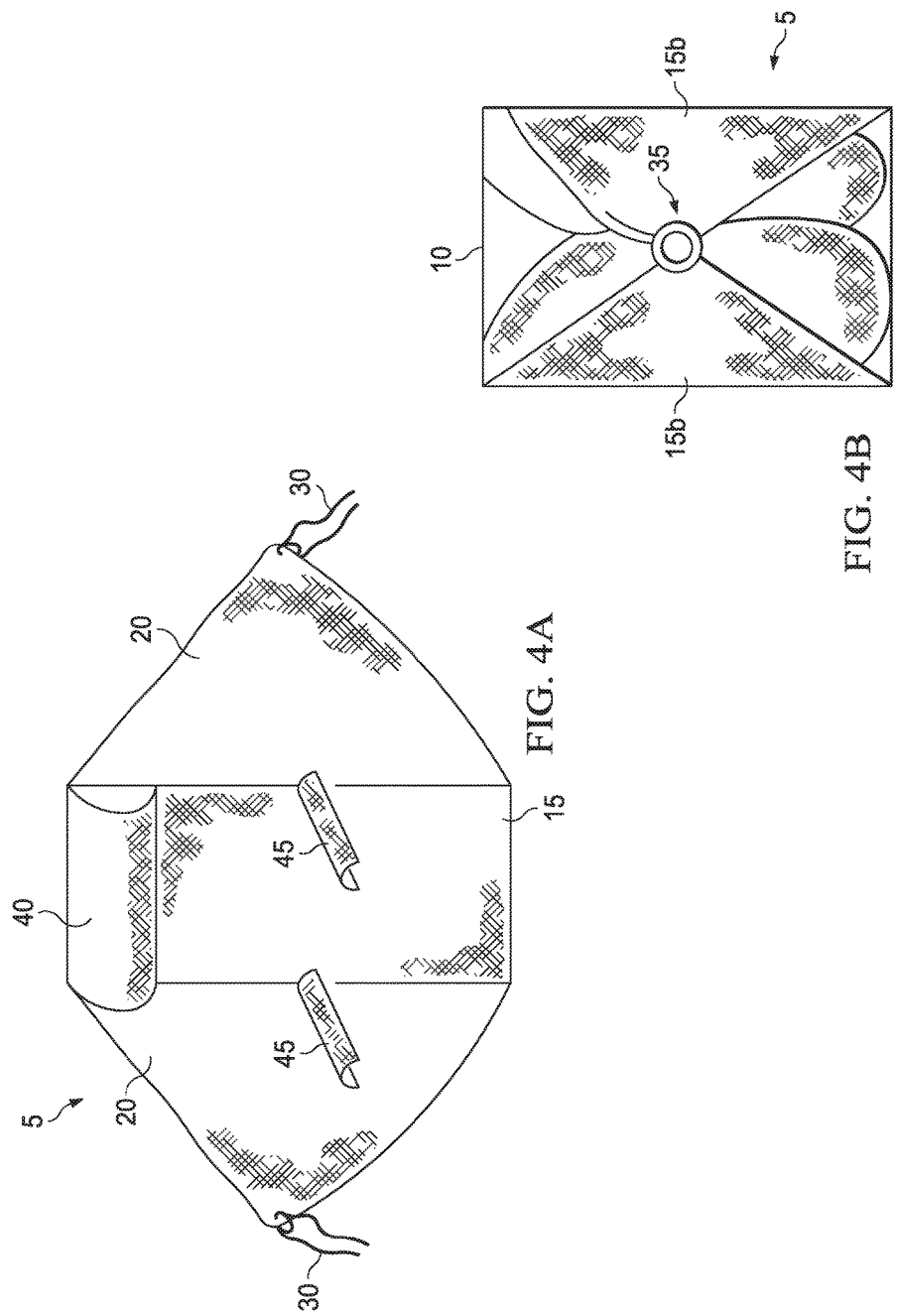

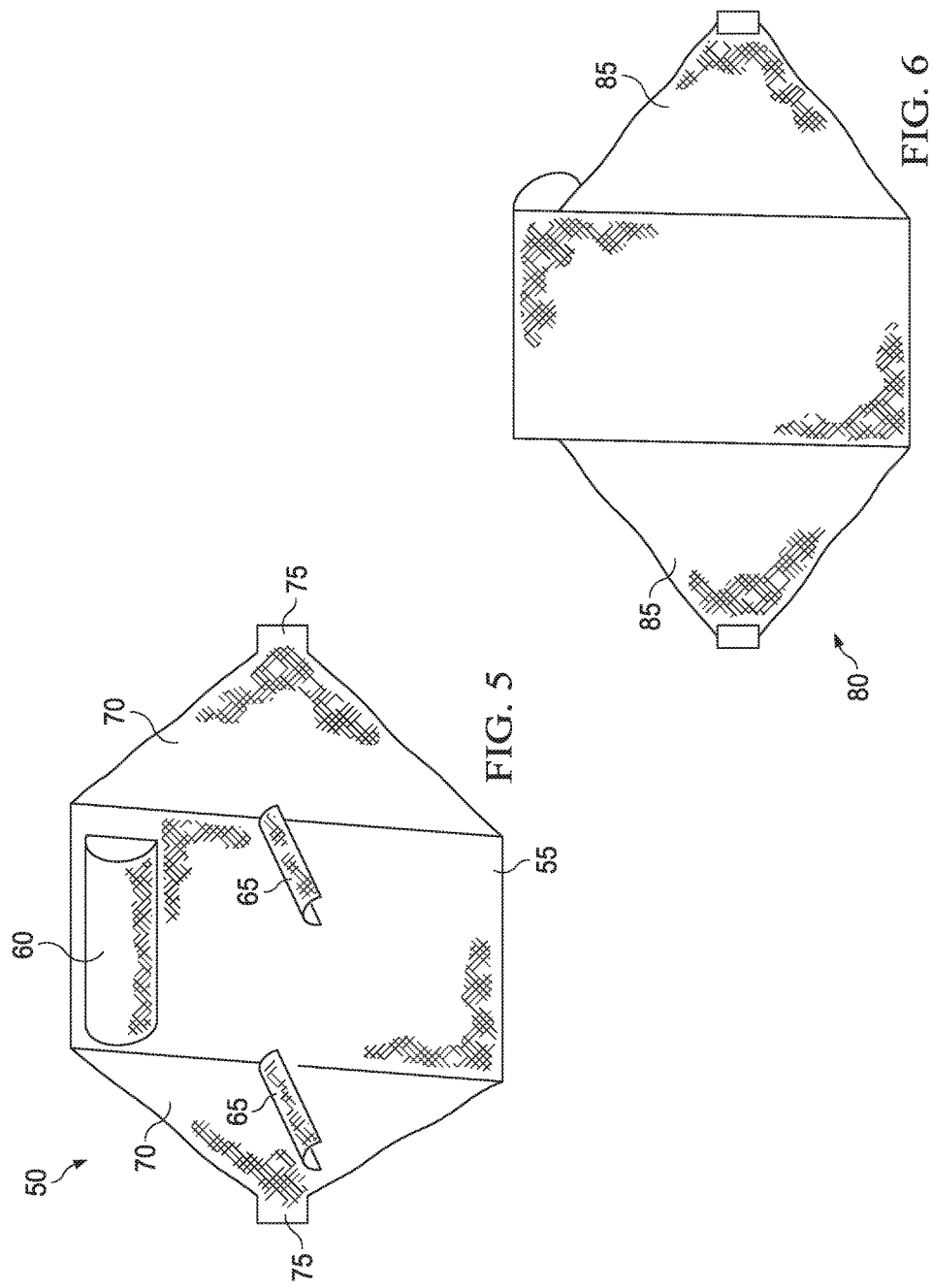

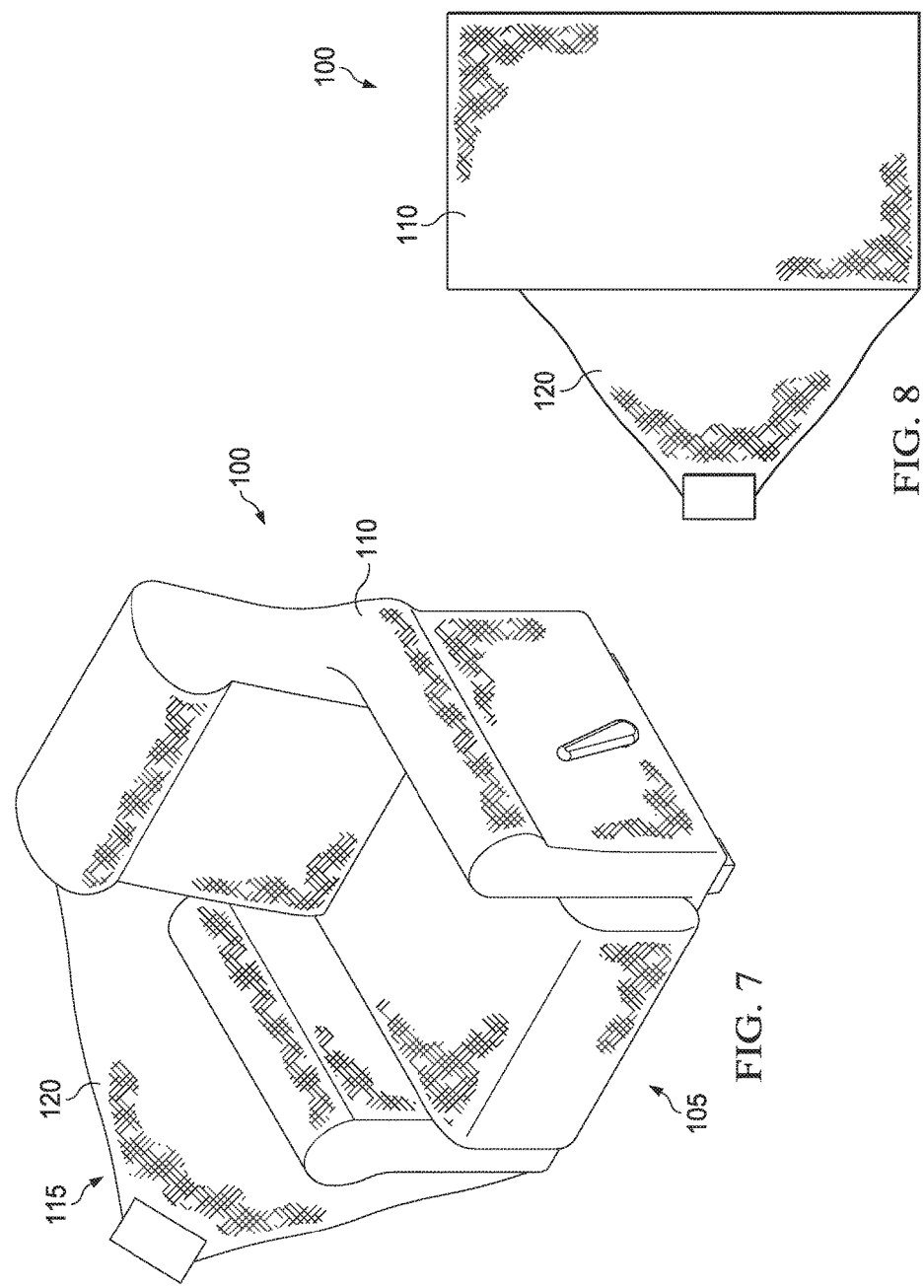

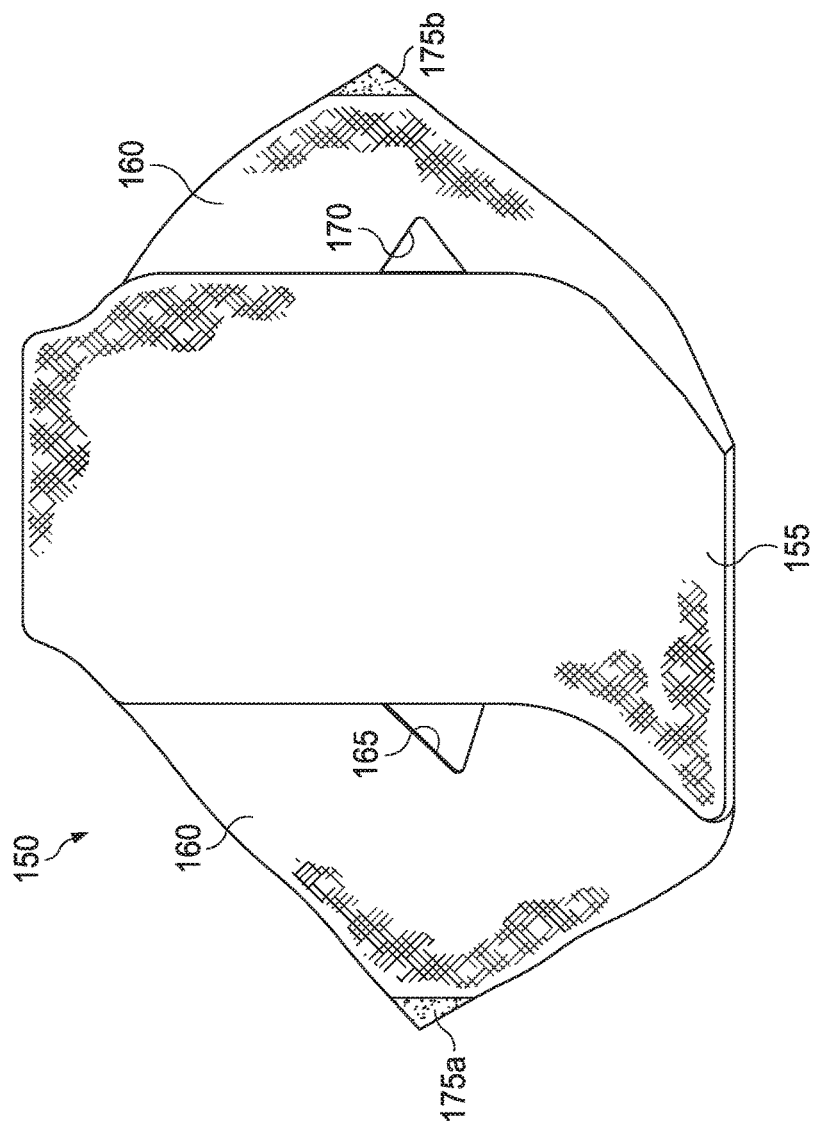

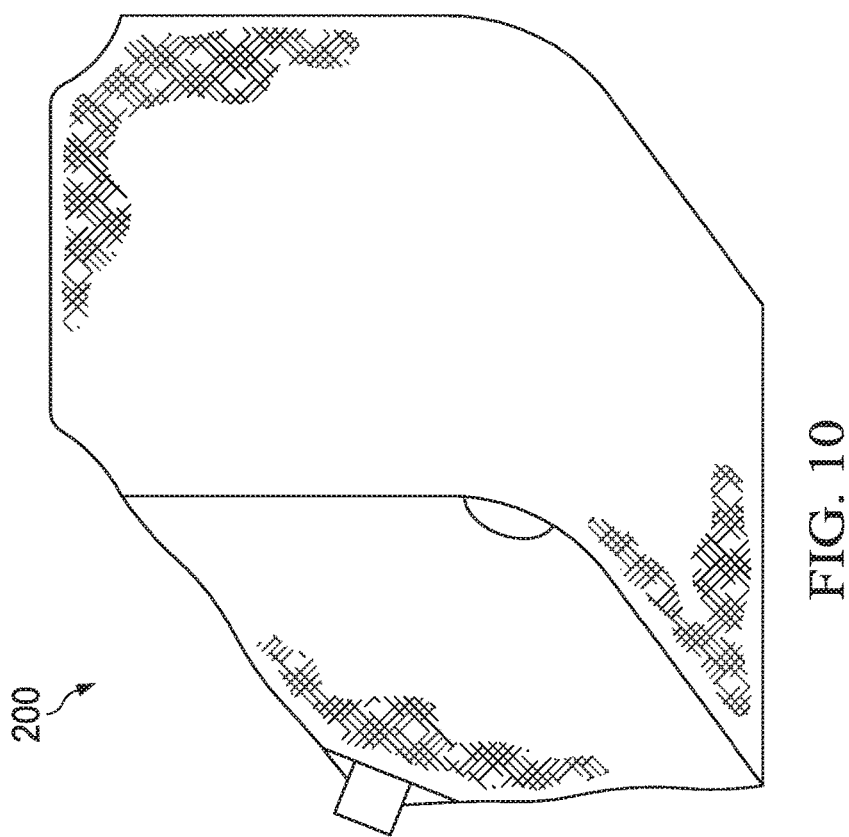

SEAT COVER WITH OCCUPANT COVERING FEATURE

CROSS-REFERENCE TO RELATED APPLICATIONS

This application claims the benefit of U.S. Provisional Application No. 62/355,040, filed on Jun. 27, 2016, which is hereby incorporated by reference as if fully recited herein.

TECHNICAL FIELD

Exemplary embodiments described herein are directed to seat covers, and more particularly, to seat covers that are also adapted to simultaneously cover at least a portion of a human occupant of said seat.

BACKGROUND

Various types of removable seat covers are well known, particularly those for use on furniture such as chairs and sofas, as well as those for use on vehicle seats. Some such removable covers are essentially just blanket-like or sheet-like in design, so that said covers may be easily draped over a given seat. Other removable covers are more fitted to a particular type or size range of furniture. Such removable covers may be used, for example, to preserve the condition of the primary covering material of a seat, or to improve the appearance of a seat with an already degraded primary covering material.

Coverings for humans are also well known. Such coverings may include, for example, sheets, blankets, throws, quilts, etc., any of which may be used to cover all or a portion of human body while sleeping in a bed or while sitting in or lying on another piece of furniture. For example, it is quite common in colder climates for a person to cover themselves with a blanket or throw while reading or watching television on a couch or chair.

While removable seat covers and coverings for humans may both be well known, the inventor is aware of no device that is designed for or capable of simultaneously performing both functions. Particularly, the inventor is aware of no seat covers that are designed to also simultaneously cover at least a portion of an occupant of the seat to which the cover is installed. Nonetheless, it can be understood that a seat cover with such dual functionality would be desirable from a convenience standpoint and also because it eliminates the need for a second occupant covering that must be folded and stored when not in use. Exemplary embodiments described herein are such dual-functionality seat covers.

SUMMARY

The exemplary embodiments described herein are directed to seat covers. More particularly, exemplary embodiments described herein are directed to seat covers that are also adapted to simultaneously cover at least a portion of a human occupant of the seat to which such a cover is installed.

With respect to the exemplary embodiments, a "seat" may be a piece of furniture such as a chair or sofa, or the seat of a vehicle. Consequently, exemplary seat cover embodiments may be designed for installation to different types of seating. One non-limiting example of such a seat is an upholstered (e.g., fabric, leather or vinyl covered) chair, such as a reclining chair (i.e., "recliner").

Generally speaking, an exemplary seat cover according to the general inventive concept will include a portion adapted to cover at least a section of a seat and another portion adapted to simultaneously cover at least a part of an occupant of said seat. The occupant covering portion may be connected to the seat covering portion or may be integral thereto.

The seat covering portion adapted to cover at least a part of an occupant of said seat may be in the form of two flaps that are extendable from opposite sides of the remainder of the cover and may be drawn over an occupant of the seat. Alternatively, a single flap may be used in lieu of two flaps.

In any embodiment, the flaps or flap may include a securing element to facilitate retention of the flaps or flap in a folded or otherwise stored position when not in use. For example, in one exemplary seat cover embodiment the flaps of the cover may be folded or rolled up and secured in a stored position along a side portion of the seat to which the cover is installed. Flap retention may be accomplished via a releasable retention mechanism or otherwise.

In the case of a seat that is movable or repositionable, such as but not limited to a recliner, the design of an exemplary seat cover will not impede movement of the seat. For example, a recliner may be moved between an upright and reclined position while an exemplary seat cover is installed thereto.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 4A depicts the seat cover of FIG. 1 in an uninstalled condition;

FIG. 4B illustrates the seat cover of FIG. 4A in an installed condition where rearwardly extending portions of the seat cover have been releasably secured to one another along a back portion of the recliner;

FIG. 5 is an alternative embodiment of an exemplary seat cover shown in an uninstalled condition;

FIG. 6 is yet another alternative embodiment of an exemplary seat cover shown in an uninstalled condition;

FIG. 7 depicts an alternative exemplary embodiment of a seat cover with occupant covering feature, wherein the cover is again installed to a recliner shown in an upright position, but where the seat cover has only a single occupant covering flap;

FIG. 8 depicts the seat cover of FIG. 7 in an uninstalled condition;

FIG. 9 depicts an exemplary seat cover with occupant covering feature embodiment designed for installation to a seat of a motor vehicle; and FIG. 10 shows another exemplary seat cover with occupant covering feature embodiment designed for installation to a seat of a motor vehicle, but with only a single occupant covering feature.

DETAILED DESCRIPTION OF THE EXEMPLARY EMBODIMENTS

Figure 1:
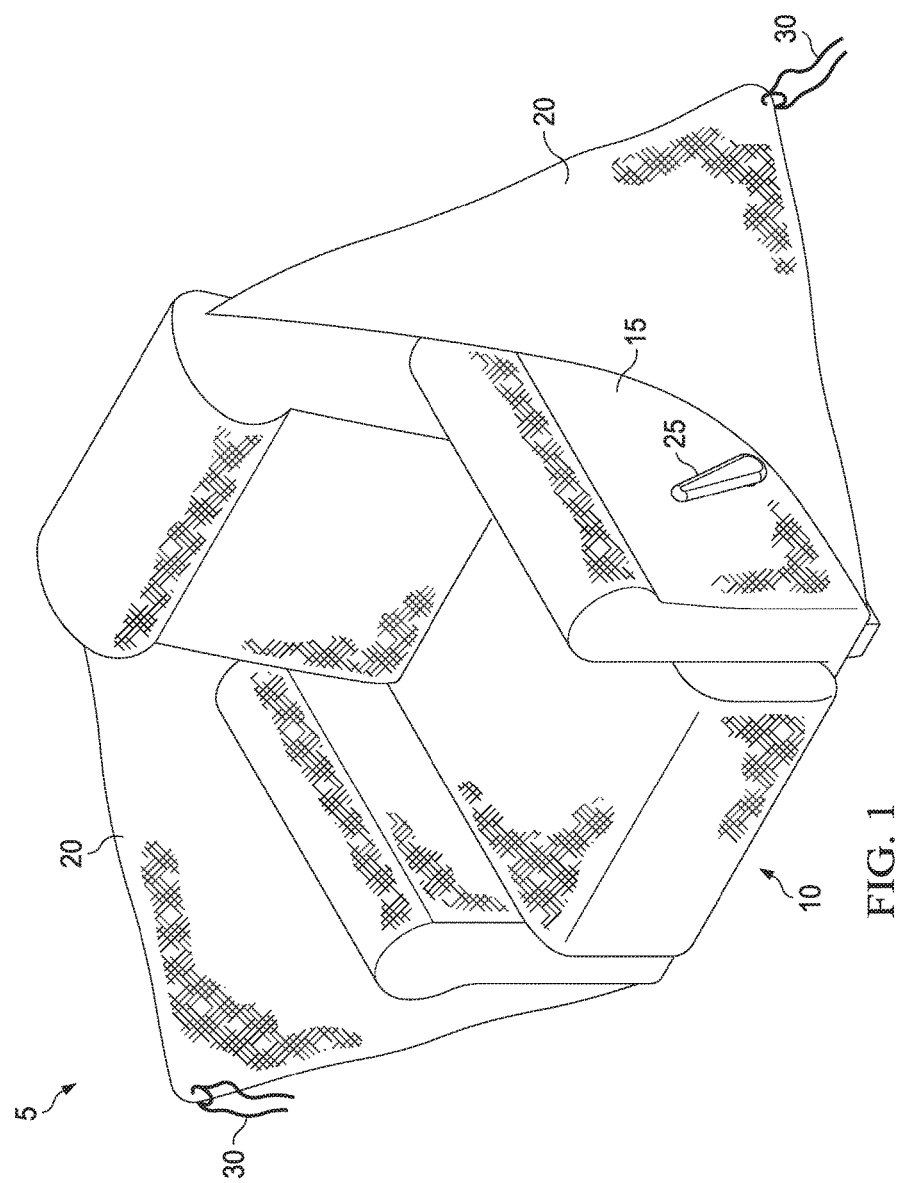
FIG. 1 depicts an exemplary embodiment of a seat cover with occupant covering feature, wherein the cover is installed to a recliner shown in in an upright position, and wherein an occupant covering portion is shown extended for purposes of illustration.

One exemplary embodiment of a seat cover with occupant covering feature 5 (hereinafter "seat cover" for brevity) installed to an associated seat 10 is shown in FIG. 1. In this exemplary embodiment, the seat is a reclining chair (i.e., recliner), which is shown in FIG. 1 to reside in an upright position. Alternative seat cover embodiments may, of course, also be adapted for installation to other types of seating.

As shown in FIG. 1, the exemplary seat cover 5 includes a seat covering portion 15 and an occupant covering portion 20. That is, the seat cover 5 includes a portion 15 that is adapted to cover at least a part of the recliner 10 and another portion 20 that is adapted to simultaneously cover at least a part of an occupant of said recliner.

In the particular exemplary seat cover embodiment 5 shown in FIG. 1, the occupant covering portion is provided in the form of two flaps 20 that are attached or integral to the remainder of the seat covering portion 15 of the seat cover 5 along substantially opposite sides thereof. The flaps 20 may be connected to the seat covering portion 15, such as by sewing or the like. Alternatively, and as better illustrated in FIG. 4A, the flaps 20 of this exemplary seat cover 5 may be integral to the remainder of the seat covering portion 15 of the seat cover 5. That is, the flaps 20 and the remainder of the seat covering portion 15 of the seat cover 5 are all formed from the same piece of material.

The exemplary seat cover embodiment 5 is shown in FIG. 1 to be substantially installed to the recliner 10. Some seat cover embodiments may have a substantially fitted design (see e.g., FIG. 4A and FIG. 5) while other exemplary seat cover embodiments may have a less fitted design (see e.g., FIG. 6). In either case, the seat covering portion of an exemplary seat cover may be attached to an associated seat in any manner known to one of skill in the art. For example, and without limitation, drawstrings, elastic straps, snaps, buttons, hooks, clips, pins and/or hook and loop fasteners (e.g., Velcro®) may be used for this purpose.

Referring still to FIG. 1, it can be further observed that the occupant covering portion (i.e., flaps 20) of the seat cover 5 are extendable from opposite sides of the installed seat cover. In this exemplary embodiment, the flaps 20 are shown to be attached along the intersection of the back and sides of the recliner 10, although other occupant covering portion emanation points are possible in other embodiments.

The flaps 20 are shaped and dimensioned so that the flaps may be drawn over an occupant of the recliner to cover all or a part of the occupant. In this particular example, the flaps 20 are substantially triangular in shape and dimensioned to cover at least the torso and a portion of a seated occupant's legs, while avoiding coverage of the occupant's head and face. Other occupant covering portion shapes (e.g., square, rectangular, circular) and dimensions are possible in other embodiments, such that more or less of a seated occupant may be covered thereby. Also, while the seat cover embodiment of FIG. 1 is provided with an occupant covering portion in the form of two flaps 20, it should be realized that a fewer or greater number of flaps may also be utilized in other embodiments. For example, a single flap of sufficient dimension may be used in lieu of two flaps (see e.g., FIG. 8).

Figure 2:
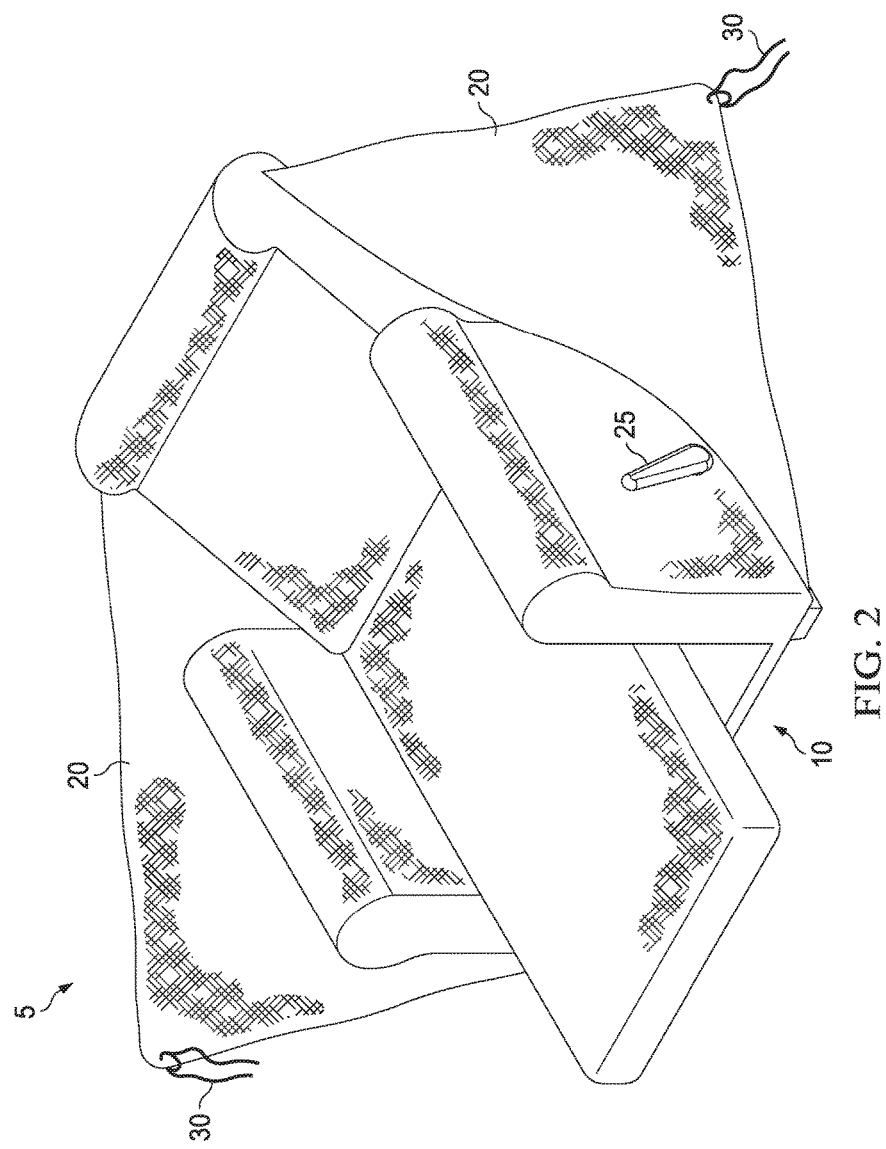
FIG. 2 shows the covered recliner of FIG. 1 in a reclined position.

In the case of seating that is movable or repositionable, such as but not limited to the recliner 10 of FIG. 1, the design of an exemplary seat cover should not impede movement of the seat and should not obstruct access to furniture controls. For example, and referring also to FIG. 2, it can be seen that the recliner 10 may be moved between the upright position of FIG. 1 and a reclined position while the exemplary seat cover 5 is installed to the recliner. The seat cover 5 is retained on the recliner 10 in either position, and the flaps 20 are accessible and usable to cover an occupant in either position. It can also be seen that access to and operation of the recliner actuator 25 is not obstructed by the seat cover 5.

Figure 3:
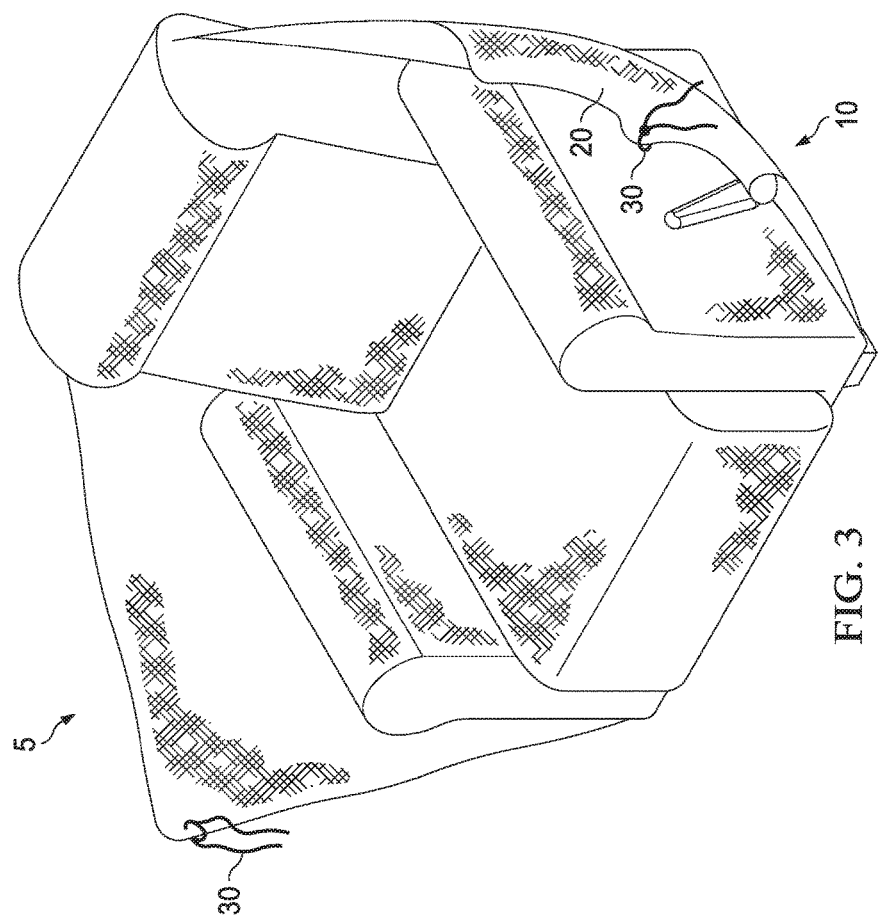
FIG. 3 shows the covered recliner of FIG. 1 with the occupant covering flaps of the seat cover folded and placed in a stored position.

In at least some exemplary seat cover embodiments, the occupant covering portion may be placed in a stored position when not in use. For example, as indicated in FIG. 3, one of the flaps 20 of the seat cover 5 shown in FIGS. 1-2 may be folded or rolled up and secured in a stored position along the associated side of the recliner 10. In this example, the flap 20 is secured in the stored position using a drawstring 30. Other means of securing the occupant covering portion in a stored position may be employed in other embodiments. For example, snaps, buttons and button holes, ties, hooks, etc., may be used for this purpose Stored occupant covering portion retention may alternatively or additionally occur by releasably securing the occupant covering portion (e.g., flaps) to the seat itself. Further, the retention mechanism provided to retain an occupant covering portion of an exemplary seat cover in a stored position may also be used to releasably secure the occupant covering portion after covering of an occupant. Alternatively, a separate retention mechanism may be provided for this purpose. Similarly, while the flaps 20 are represented as being secured along a side of the recliner 10 in FIG. 3, the occupant covering portion(s) of other seat covers may be stored in other locations. In any case, storing the occupant covering portion prevents the occupant covering portion from becoming soiled by residing partially on the floor when not in use and also presents a more orderly appearance in comparison to allowing the flaps to simply hang downward or to be haphazardly thrown across the seat portion of the recliner.

The exemplary seat cover 5 of FIG. 1 is depicted in FIG. 4A in an uninstalled condition, and in FIG. 4B in an installed condition. As shown the seat cover 5 includes the seat covering portion 15, which further comprises a headrest portion 40, arm portions 45, and rearwardly extending portions 15b that are provided to help secure the seat cover 5 to the recliner 10 but which are not visible in FIG. 4A. The headrest portion 40 may be fitted or may be of drapable design. Likewise, the arm portions 45 may be fitted or may alternatively be shaped and dimensioned to just generally approximate the shape and dimensions of the arms of the recliner 10. It can also be seen in FIG. 4B that the rearwardly extending portions 15b of the seat cover 5 may be wrapped across a rear portion of the recliner 10 and secured together to assist in securing the seat cover to the recliner. A fastening mechanism 35 may be provided on the rearwardly extending portions 15b of the seat cover 5 for this purpose.

An alternative and uninstalled exemplary seat cover 50 is illustrated in FIG. 5. As shown, the exemplary seat cover 50 is similar to the exemplary seat cover 5, and again includes a seat covering portion 55 having a headrest portion 60 and arm portions 65, as well as an occupant covering portion in the form of a pair of flaps 70. It can also be seen that the flaps 70 again extend substantially laterally from opposite sides of the seat cover 50 so as to function as occupant covers as described above with respect to the flaps 20. However, the flaps 70 of the seat cover 50 are of a slightly different shape than the flaps 20 of the seat cover 5, and also terminate in square ends 75.

Another alternative and uninstalled exemplary seat cover 80 is illustrated in FIG. 6. As shown, this exemplary seat cover is of a more generic shape in comparison to the seat covers 5, 50 shown in FIGS. 4A and 5, and lacks any fitted features, such as fitted headrest portions or arm portions. The seat cover 80 does, however, include an occupant covering portion in the form of a pair of flaps 85. In such an embodiment, the cover may be simply draped over a given seat, tucked into cushions, etc. The flaps 85 of the seat cover 80 may be of various shape and size, and may terminate in square, triangular, circular, etc., ends.

As mentioned above, an exemplary seat cover embodiment, such as but not limited to, the seat cover embodiments 5, 50, 80 of FIGS. 4A, 5 and 6, may include a fastening mechanism that allows rearwardly extending portions of the seat cover to be releasably connected to help retain the seat cover on the seat to which it is installed. Such fastening mechanisms may again include, without limitation, a hook and loop fastener, snaps, buttons and button holes, ties, hooks, etc. A similar technique may be used to secure other portions of a seat cover to other parts of a seat in other embodiments.

Yet another alternative embodiment of a seat cover 100 is respectively illustrated in an installed and uninstalled condition in FIGS. 7-8. Like the exemplary seat cover 5 of FIG. 1, this exemplary seat cover 100 is also installed to a recliner 105 for purposes of illustration, and the recliner is again shown in an upright position. The seat cover 100 includes a seat covering portion 110 that is adapted to cover at least a part of the recliner 105 and an occupant covering portion 115 that is adapted to simultaneously cover at least a part of an occupant of said recliner. In this exemplary seat cover 100, however, the occupant covering portion 115 comprises only a single flap 120.

The seat cover 100 of FIGS. 7-8 may be manufactured of any of the materials mentioned above with respect to other seat cover embodiments. The seat cover 100 of FIGS. 7-8 may be installed to and/or secured to the recliner 105 in any manner described above with respect to the seat cover 5 of FIG. 1. Likewise, retention of the occupant covering flap 120 may be accomplished in any manner described above. The seat cover 100 may be of fitted design in a similar manner to the seat cover 5 of FIG. 1 or, as indicated in FIG. 8, may be of a more generic, non-fitted, design.

Still another alternative embodiment of a seat cover 150 is illustrated in FIG. 9. Unlike the previously described exemplary seat cover embodiments, this exemplary seat cover 150 is designed for installation to a seat of a motorized vehicle which, as used herein, may include an automobile, a truck, a bus, a train, a plane, etc. As shown, the exemplary motorized vehicle seat cover 150 includes a seat covering portion 155 and an occupant covering portion 160. In the particular exemplary motorized vehicle seat cover embodiment 150 shown in FIG. 9, the occupant covering portion is again provided in the form of two flaps 160 that are attached to the remainder of the seat covering portion 155 of the seat cover 150. The flaps 160 may be connected to or integral to the seat covering portion 155, as described above with respect to other exemplary seat cover embodiments.

The flaps 160 forming the occupant covering portion of the motorized vehicle seat cover 150 are extendable from opposite sides of the seat cover, and are shaped and dimensioned so as to be drawn over an occupant of the vehicle to which the seat cover is installed. In this particular example, the flaps 160 are again substantially triangular in shape and dimensioned to cover at least the torso and a portion of a seated occupant's legs, while avoiding coverage of the occupant's head and face. Other occupant covering portion shapes (e.g., square, round or rectangular) and dimensions are possible in other embodiments, such that more or less of a seated occupant may be covered thereby.

As FIG. 9 illustrates, the flaps 160 of this and other exemplary seat covers may be of dissimilar size and/or shape. For example, the seat cover 150 shown in FIG. 9 is designed for installation to a passenger side of a motorized vehicle and, consequently, the driver-facing flap 160 may be of smaller dimension to minimize interference with a center console, shifter, etc., of the vehicle.

The exemplary seat cover embodiment 150 may be attached to a vehicle seat in any manner known to one of skill in the art. For example, and without limitation, elastic straps may be used for this purpose. It should also be noted that when installed, the seat cover 150 should not impede movement of the seat nor obstruct access to seat controls or seat belt buckles. In this regard, one or more openings 165, 170 may be provided to permit proper access to a seat belt buckle of the vehicle.

While the seat cover embodiment of FIG. 9 is provided with an occupant covering portion in the form of two flaps 160, it should also be realized that a different number of flaps may also be utilized in other vehicle seat cover embodiments. For example, a single flap of sufficient dimension may be used in lieu of two flaps. Such an exemplary, single flap, seat cover 200 is shown in FIG. 10. The single flap seat cover 200 may otherwise be similar to the seat cover 150 described above.

Exemplary motorized vehicle seat cover embodiments may include a retention mechanism to facilitate retention of an occupant covering portion of the seat cover in an in-use (covering) position. For example, in the exemplary seat cover embodiment 150 of FIG. 9, the flaps 160 may include cooperating portions 175a, 175b of a hook and loop fastener assembly, or a drawstring, that may be connected once the flaps 160 are drawn over the seat occupant to releasably retain the flaps in the in-use position. Other retention mechanisms such as but not limited to, drawstrings, may alternatively be employed for the same purpose.

Exemplary seat cover embodiments are not limited to construction from any particular materials. Rather, any materials from which known seat (or other furniture) covers are manufactured or from which is known to be covered may be used. The seat covering portion and occupant covering portion of a given seat cover may also be constructed from different materials. For example, it may be desirable to construct the occupant covering portion of a given seat cover from a heavier or otherwise more insulating material for purposes of providing warmth to an occupant. In this regard, it is also possible for the occupant covering portion of a given seat cover to be of a filled design.

As with the materials used, exemplary seat cover embodiments as described herein are not limited to any particular shapes or dimensions. Rather, seat cover shapes and dimensions may be altered to conform to different types and sizes of seating and occupants thereof.

Exemplary seat cover embodiments may include any number of functional and/or non-functional optional features. For example, one or more pockets may be provided in/on the occupant covering portion and/or the seat covering portion of a given seat cover embodiment to allow for the storage of TV remote controls, reading glasses, snacks, magazines, or any number of other items. A given seat cover embodiment may also be decorated to include names or logos, or in any number of other ways, such as by embroidering, silk screening, or any other technique familiar to one of skill in the art. Other optional features are, obviously, also possible.

While certain exemplary embodiments are described in detail above, the scope of the inventive concept is not to be considered limited by such disclosure, and modifications are possible without departing from the spirit of said inventive concept as evidenced by the following claims:

What is claimed is:

1. A removable cover for a seat in the form of a reclining chair, comprising:
   a chair covering portion configured to cover at least a part of the reclining chair, the chair covering portion including at least a seating section, a headrest section, a pair of arm sections, and a pair of rearwardly extending sections that extend from opposite sides of the chair covering portion and are configured for connection to one another after wrapping around a back portion of the reclining chair;
   at least one covering-to-chair retention mechanism configured to releasably secure the various chair covering portion sections to corresponding parts of the reclining chair; and
   an occupant covering portion associated with the chair covering portion, the occupant covering portion having a first end attached near the headrest section of the chair covering portion and an opposite end attached near a bottom of the chair covering portion, the occupant covering portion extending from at least one side of the chair covering portion and configured to cover at least a portion of an occupant of the reclining chair while the chair covering portion is simultaneously secured to the reclining chair;
   wherein the sections of the chair covering portion are configured to remain secured to the corresponding parts of the reclining chair and to remain in place during movement of the reclining chair between an upright position and an inclined position; and
   wherein the occupant covering portion is usable in both the upright position and the inclined position of the reclining chair.

2. The reclining chair cover of claim 1, wherein the occupant covering portion is integral to the chair covering portion.

3. The reclining chair cover of claim 1, wherein the occupant covering portion is separate from but attached to the chair covering portion.

4. The reclining chair cover of claim 1, wherein the occupant covering portion is selected from the group consisting of a pair of flaps extending from substantially opposite sides of the chair covering portion and a single flap extending from one side of the chair covering portion.

5. The reclining chair cover of claim 1, further comprising a stored position retention mechanism configured to releasably retain the occupant covering portion in a stored position.

6. The reclining chair cover of claim 1, further comprising an opening in the chair covering portion, the opening dimensioned and positioned to permit access to a recliner actuator subsequent to installation of the chair covering portion to the reclining chair.

7. The reclining chair cover of claim 1, further comprising a fastening mechanism configured to releasably connect one rearwardly extending section of the chair cover portion to the other along a rear of the reclining chair.

* * * * *